Patented May 19, 1942

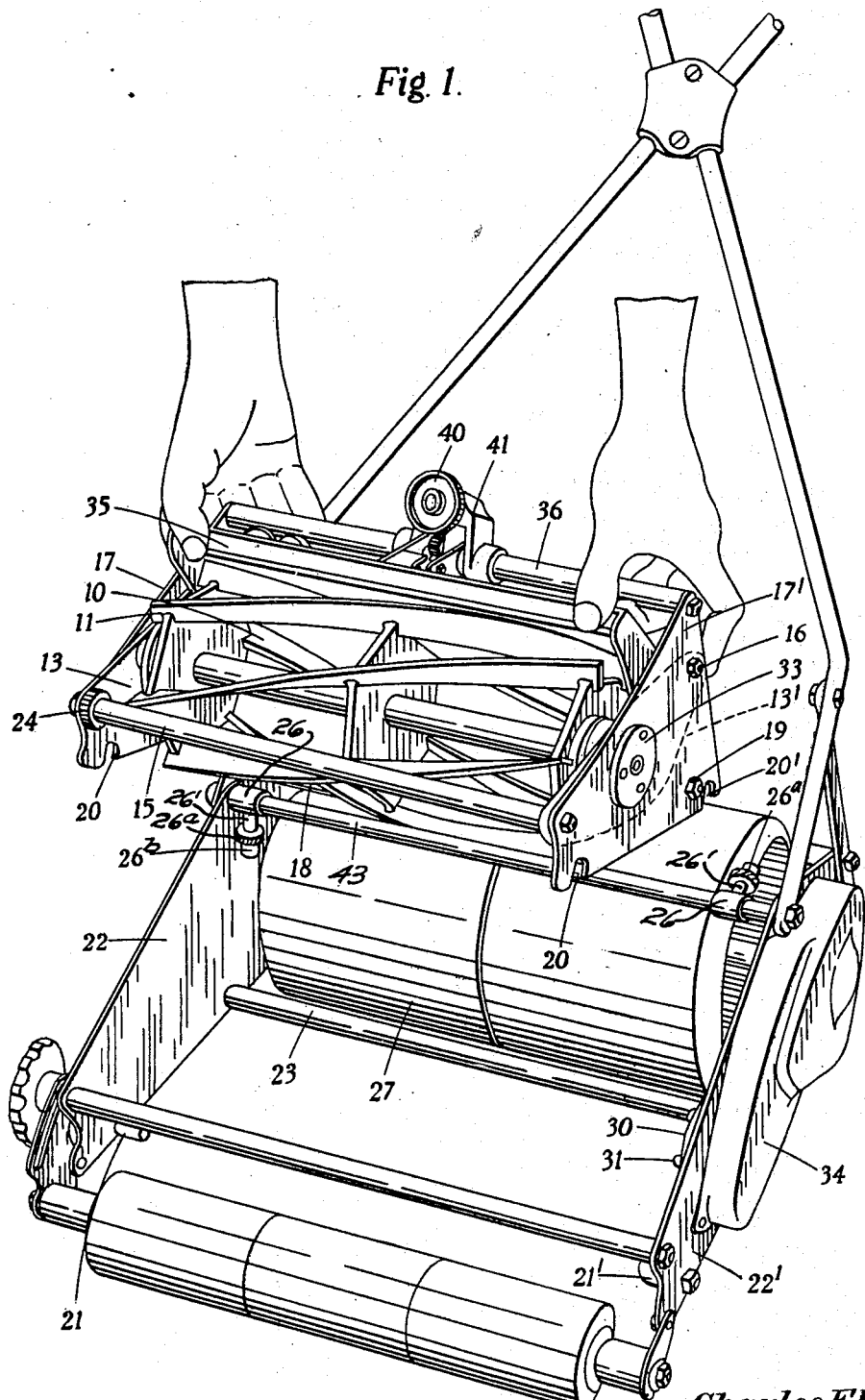

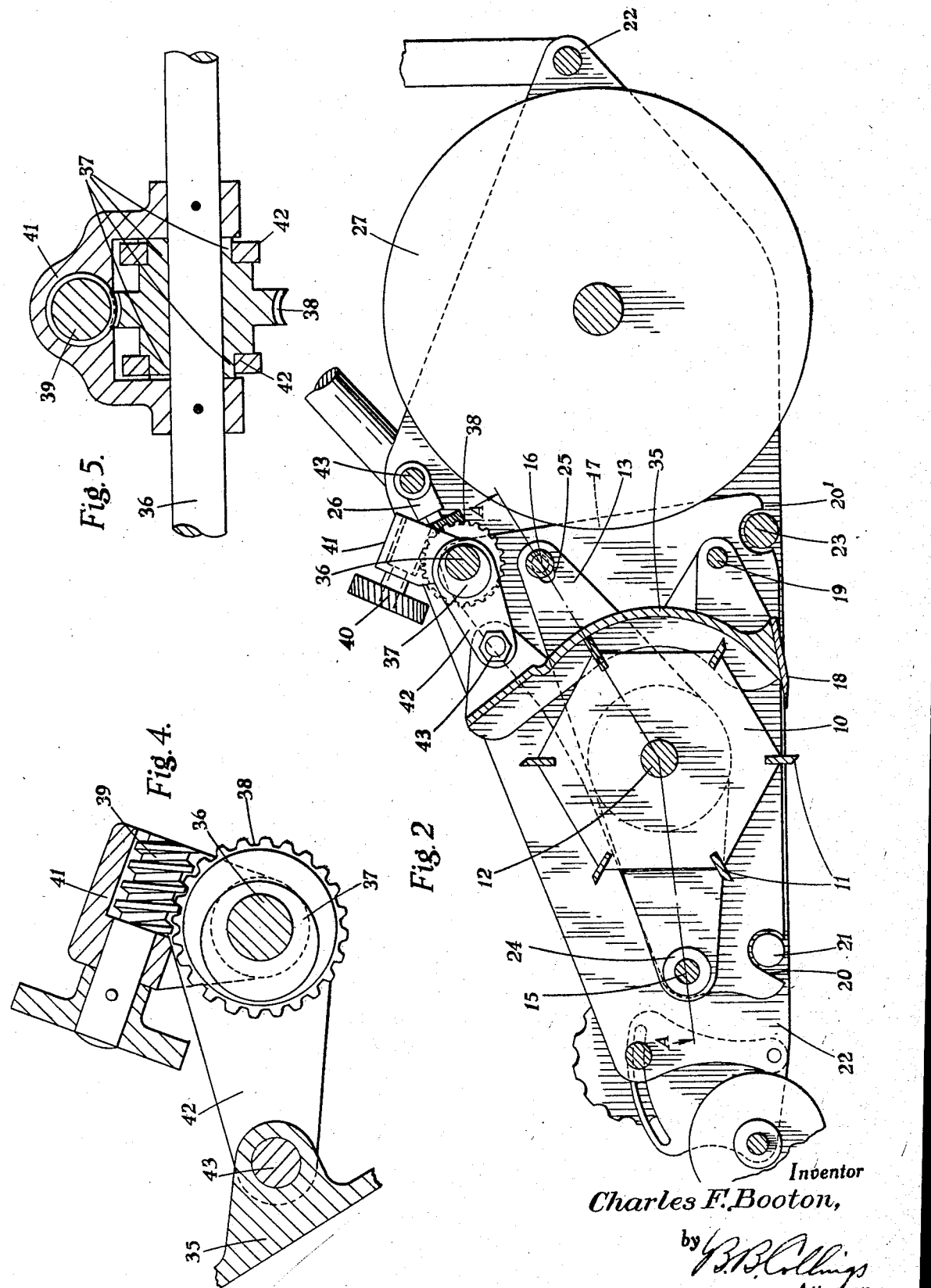

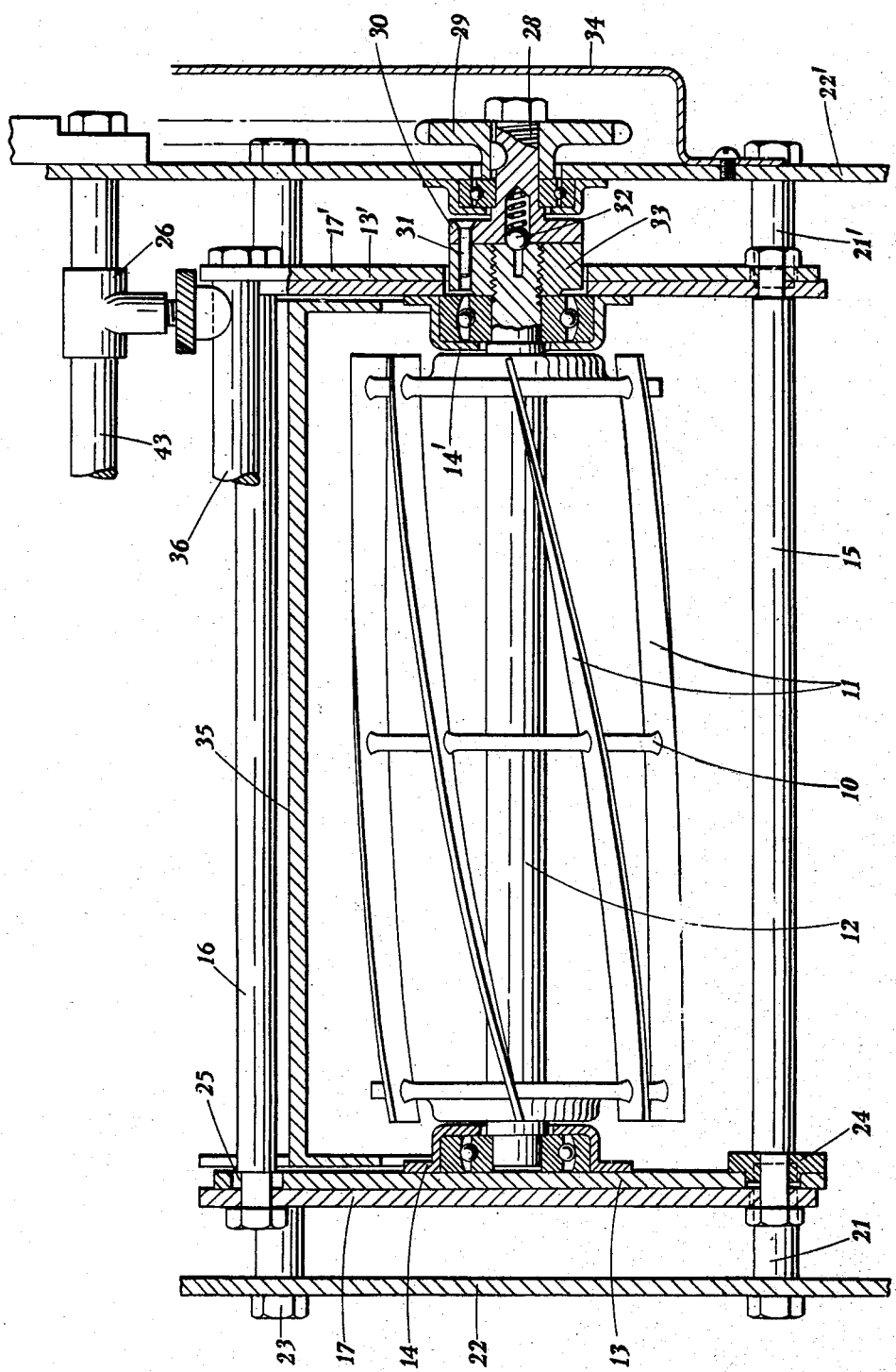

2,283,161

UNITED STATES PATENT OFFICE 2,283,161

LAWN MOWER AND THE LIKE

Charles Francis Booton, Anstey, England, assignor to J. P. Engineering Company Limited, Leicester, England Application March 23, 1939, Serial No. 263,766
In Great Britain April 8, 1938

6 Claims. (Cl. 56—249)

This invention is for improvements in and relating to lawnmowers and like mowing machines of the type comprising a rotary cutter and a stationary or non-rotatable blade (hereinafter termed the shear blade) co-operating therewith, and is applicable to hand-propelled machines, power driven machines such as motor mowers, and to machines which, like gang mowers, are intended to be towed. As is well known in machines of this type it is customary to mount the rotary cutter across the frame of the machine, and it is necessary periodically to remove the rotary cutter (which is commonly provided with helically disposed knife blades) from the machine to sharpen it by grinding. The sharpening is an operation that can only be carried out on a grinding machine, and hence it is necessary to send the cutter to some centre (e. g. back to the maker) equipped with the necessary machine tool, when it needs sharpening. It not infrequently happens that in this sharpening operation the rotary cutter is not ground perfectly parallel. For example it may be tapered to the extent of a few thousandths of an inch. The fact that the cutter has been removed from the mowing machine, and re-ground, and particularly if said cutter is not quite parallel, necessitates that (in mowing machines as commonly constructed) the shear blade shall be adjusted in relation to it after the cutter has been restored to the machine. This adjustment is an operation that the owner of the machine often is reluctant or incompetent to undertake. It is therefore frequently neglected, and because of this neglect complaints are often made that the machine does not function properly after sharpening.

The present invention provides a lawnmower or like mowing machines of the type specified, comprising two units, one of which is a cutter unit comprising the rotary cutter and the shear blade, and the other of which is a parent chassis which is equipped with wheels, rollers, or the like and is arranged to receive the cutter unit in such manner that the rotary cutter extends transversely within it, characterised in that said units are readily separable as such. By the statement that the units are readily separable as such, it is to be understood that they are readily separable without dismantling either of them. As will readily be appreciated, were it necessary to take to pieces, or to remove any substantial part of, one unit (e. g. the parent chassis) before the other (e. g. the cutter unit) could be removed a prime object of this invention would be nullified. The said object is to provide a machine so constructed and arranged that the ordinary user thereof can, without the exercise of any degree of mechanical skill and with no trouble, detach the rotary cutter and the acompanying shear blade as a unit from the remainder of the machine when said blade needs sharpening, and can subsequently restore the said unit with equal facility. The provision of the rotary cutter and shear blade in a unit that is readily separable from the remainder of the machine permits said unit to be sent, when the cutter needs sharpening, to some centre (such for example as the manufacturers of the machine) well equipped to perform this operation. There, subsequent to the sharpening operation, the edge of the shear blade may be re-set in the correct relationship, in the unit, to the rotary cutter before the unit is returned to the owner (said unit desirably incorporating adjustment means for adjusting the relation of the shear blade and the rotary cutter), and upon the return of said unit the owner merely replaces it in the parent chassis and is not under the necessity to make any adjustment between the shear blade and the rotary cutter.

This invention also includes a lawnmower or like mowing machine of the type specified, comprising two units which are readily separable as such, one of which is a cutter unit comprising the rotary cutter, the shear blade, and a mounting for said cutter and blade wherein the rotary cutter is supported at both ends, and the other of which is a parent chassis which is equipped with wheels, rollers, or the like and is arranged to receive detachably and to support the cutter unit in such manner that the rotary cutter extends across the chassis.

In order that the invention may be better understood, reference will now be made to the accompanying drawings, in which—

Figure 1 shows a roller-driven lawnmower according to this invention, with the aforesaid cutter unit raised from the parent chassis;

Figure 2 is a longitudinal section through said mower, with the cutter unit in position in the parent chassis;

Figure 3 is a section through said unit, taken on the line A—A in Fig. 2; while

Figures 4 and 5 are sections through the mechanism incorporated in the unit, for adjusting the shear blade vertically.

In the illustrated construction, the rotary cutter 10 (which consists of a plurality of blades 11 located in helical form around a central driving spindle 12) has the ends of its spindle journalled in bearings, desirably ball or roller bearings, in two spaced brackets 13, 13'. Each bracket is provided with a central housing 14, 14' for the ball or roller bearing and has two arm-like portions projecting substantially diametrically therefrom, the termination of each said portion being pierced with an aperture. The two brackets are connected by two cross members or bars 15, 16 which at their ends have reduced portions that are received in the aforesaid terminal apertures and are also received in suitable holes in two plate-like frame members 17, 17' that are located one against the outer face of each bracket. That end of each cross member that projects through the adjacent plate-like member receives a nut and if necessary a washer, so that the whole assembly is clamped together.

It may be here mentioned that one end of the cutter spindle 12 projects through a suitable aperture in the plate-like frame member 17' so that the drive may be applied to it. The other member 17 is not apertured, so that the other end of the spindle is completely concealed.

The shear blade 18 is mounted on the plate-like frame members, for example by means of a transverse member 19 that extends across between them. Thus there is formed a unit or sub-assembly comprising the brackets, frame members, cross members, rotary cutter, and shear blade. This cutter unit is provided with elements such for example as lugs, slots, key-ways or the like on the frame members for co-operating with corresponding elements in the parent chassis of the mowing machine to position the cutter unit with accuracy.

Conveniently, there are slots such as 20, 20' at the front and rear of the frame members 17, 17' in which are received pins 21, 21' projecting inwards from the main side plates 22, 22' of the parent chassis of the machine near the front thereof and a tie-rod 23 extending between said plates 22, 22'.

The shear blade 18, which in use is located at the rear of the rotary cutter 10 and substantially tangentially to the lower part of its periphery, is adjustably mounted in the cutter unit. For example adjustment in its own plane and in a plane at right angles thereto may be provided for. The rotary cutter is also adjustably mounted in the cutter unit. For this purpose the front terminal aperture of that bracket 13 which is opposite the driving end of the cutter spindle 12 is bored somewhat larger than the other apertures and receives an eccentric sleeve 24 which is positioned on the reduced end of the front cross bar 15. This sleeve is provided with an exposed hexagon or the like whereby it may be rotated on said cross bar. At the other end of said bracket 13 there is provided a slot 25 for the reception of the reduced end of the other cross bar 16. Hence, if, after the nuts on the adjacent ends of the said cross bars have been slacked off, the eccentric sleeve 24 is rotated the position of the rotary cutter is adjusted into parallelism with the shear blade in the cutter unit. Such adjustment may be employed to compensate for a slight taper in the rotary cutter.

The cutter unit just described is arranged to be removably located in the parent chassis of the mowing machine. This parent chassis is shown below the raised cutter unit in Fig. 1 and itself forms a complete unit, the two units being readily separable as such. As shown, this separation is effected by a movement laterally of the cutter axis.

The said parent chassis comprises in the main the side frame members 22, 22' (the spacing of which is greater than that of the side frame members 17, 17', of the cutter unit), and tie rods rigidly connecting them together, and is equipped with transport or driving rollers or the like, here illustrated as rollers 27. Normally the removable cutter unit is supported in the parent chassis at spaced points (20, 20') as has been described, with the cutter blade extending across the chassis, and releasable retaining means are provided for holding the cutter unit against the supports provided at said spaced points.

In the illustrated construction the said means for holding the cutter unit in position comprise two T-shaped members 26 journaled in laterally spaced relation upon a tie bar 43 which extends between the main side frame members 22, 22' of the parent chassis. Into the stem 26' of each of the said members 26 a screw 26$^a$ is threaded, the head of which carries a member 26$^b$ which is engageable with a cross bar 36 of the cutter unit, as shown at the right of Fig. 3. The pressure exerted by the screws 26$^a$ as they are moved outwardly is transmitted through the members 26$^b$ and cross bar 36 to the side plates 17 and 17' of the cutter unit, thereby causing the rear walls of the slots or recesses 20 and 20' of the said plates to jam against the pins 21, 21' and the tie rod 23 respectively, thus preventing lateral or endwise shifting of the cutter unit in the parent chassis. When the screws 26$^a$ are moved inwardly to relieve their pressure and disengage the members 26$^b$ from the bar 36, the members 26 may be swung to inoperative positions as shown in Fig. 1, thereby permitting the cutter unit to be moved endwise to break the driving coupling, hereinafter described, and then to be lifted from the parent chassis, as illustrated in the said figure.

Transmission means are also provided for applying the drive (e. g. from the roller or wheels 27 of the machine or from the driving motor in the case of a power driven machine) to the exposed end of the cutter spindle 12, it being understood that in the case of a power driven machine the transporting roller, wheels, or the like, and the cutter, are driven in timed relation. Conveniently a short shaft 28 is permanently journalled in the parent chassis machine, this shaft carrying a pinion, chain sprocket 29, or the like, whereby the drive is applied to it (the driving means being housed in the cover 34 and being arranged to drive the cutter 10 in an anti-clockwise direction, Fig. 2). The locating means for the cutter unit are so arranged that when said unit is in position the cutter spindle is co-axial with said shaft and a readily releasable coupling is provided between the two. Desirably this coupling is of such a nature that it is readily severed by relative lateral movement between the shaft 28 and spindle 12 such as is occasioned when the removable cutter unit is withdrawn from the machine.

In the illustrated construction, the short shaft 28 terminates at its inner end in a flange 30 carrying three equally spaced driving pins 31 and a central spring-pressed ball 32 or plunger. At the corresponding end of the cutter spindle 12 there is attached a flange 33 having three clearance holes for the pins 31 and a central hole for the ball 32. This ball therefore assists in centering the spindle 12, and the fact that the pins 31 are a clearance fit in the pin-holes permits of the adjustment of the cutter 10 by the eccentric 24. The coupling may be broken, preparatory to removing the cutter unit, by sliding said unit endwise, sufficient clearance being provided for this purpose between the left hand end of the unit, Fig. 3, and the frame member 22.

The mechanism for adjusting the shear blade in the cutter unit may be of any convenient construction and may be of such a nature that adjustment may be effected without removing the cutter unit from the frame. In one arrangement the shear blade 18 is mounted at the lower edge of a plate 35 that curves around the rear portion of the periphery of the rotary cutter 10 and that is pivoted near the bottom on the cross bar 19 extending between the two side plate-like frame members 17, 17'. Near the top of said cutter unit a fourth cross-bar 36 extends between said members and on it, at any desired position in its length and conveniently at the centre, there are rotatably mounted eccentrics 37 provided with a worm wheel 38. The said worm wheel is engaged by a worm 39 (provided with a hand wheel 40) that is supported in a housing 41' fixed to said bar 36, while on the eccentrics 37 there are mounted two connecting rods 42 the small end of each of which is pivoted to the aforesaid curved plate, near the top of the latter, at 43. Hence by turning the hand wheel 40 the eccentrics 37 are rotated and the curved plate 35 rocked on its pivot 19. This causes the front or cutting edge of the shear blade 18 to be raised towards or to be lowered from the rotary cutter 10.

The brackets 13, 13', and the frame members 17, 17' and 22, 22', are advantageously of steel or other metal plate, although obviously they may be castings, stampings or the like.

I claim:

1. A mowing machine comprising a chassis unit having transport means; a unitary cutter structure including a fixed cutter member and a rotatable cutter member mounted in co-operative relation thereto; means carried by said chassis unit for readily removably receiving said unitary cutter structure and mounting it in said chassis for lateral movements therein; drive means for said rotatable cutter member, carried by said chassis unit; and a laterally separable readily detachable connection between said drive means and rotatable cutter member, connectible and disconnectible through said lateral movements of the unitary cutter structure.

2. A mowing machine comprising a chassis unit having transport means; a unitary cutter structure including a fixed cutter member and a rotatable cutter member mounted in co-operative relation thereto; means carried by said chassis unit for readily removably receiving said unitary cutter structure and mounting it in said chassis for lateral movements therein; drive means for said rotatable cutter member, carried by said chassis unit; a laterally separable readily detachable connection between said drive means and rotatable cutter member, connectible and disconnectible through said lateral movements of the unitary cutter structure; and means for preventing lateral movements of said cutter structure to maintain said drive connection in operative condition.

3. A mowing machine comprising a chassis unit having transport means and a pair of spaced side members; a unitary cutter structure including a fixed cutter member and a rotatable cutter member mounted in co-operative relation thereto, said cutter structure being of a length less than the distance between said chassis side members, whereby it may be moved laterally between them; transverse members extending between said chassis side members, for readily removably receiving said cutter structure and mounting it for said lateral movements; drive means for said rotatable cutter member carried by said chassis unit; a laterally separable readily detachable driving connection between said drive means and rotatable cutter member, connectible and disconnectible through said lateral movements of the cutter structure; and readily releasable means for retaining said unitary cutter structure in operative position in said chassis unit on said transverse supporting members.

4. A readily removable unitary cutter structure for mowers, comprising a frame including a plurality of spaced side and transverse members, one of said side members being longitudinally shiftable relative to the other members; a rotatable cutter element mounted between said side members and journaled at one end by said shiftable member; a shear blade carried by said frame independently of said shiftable member, in co-operative relation to said cutter element; and means carried by the frame for moving said shiftable member to adjust said cutter element relative to the shear blade to compensate for inaccurate grinding of the cutting edges of said element.

5. For a mowing machine, a cutter unit comprising a cutter unit frame consisting of spaced side frame members and a plurality of cross members holding them together, a rotary cutter mounted transversely on the frame for rotation about a substantially horizontal axis, which cutter has peripheral cutting edges which sweep out a surface of revolution of cylindrical form about said axis, a shear blade mounted in the frame and having an edge in close proximity to said surface at the lower part thereof to co-operate with the rotary cutter in cutting grass, means for adjusting said edge of the shear blade in relation to the said surface, supports for the rotary cutter in the frame, which supports comprise a support member alongside one of the side frame members and forming a support for one end of the rotary cutter, means for adjusting said support member, and said end of the rotary cutter, laterally of the cutter axis in relation to said one of the side frame members and the shear blade edge, and a guide for guiding said member in said lateral adjustment.

6. A cutter unit according to claim 5, having a bearing for the rotary cutter carried by said support member, extensions of said support member fore and aft of said bearing, said guide being associated with one of said extensions, and an adjustment eccentric rotatably received in the other extension and in the adjacent side frame member.

CHARLES FRANCIS BOOTON.